United States Patent Office 3,554,963
Patented Jan. 12, 1971

3,554,963
POLYALKYLATED AROMATIC COMPOUNDS AS A HEAT STABILIZER FOR OLEFIN POLYMERS
John Boor, Jr., Amstelveen, Netherlands, assignor to Shell Oil Company, New York, N.Y., a corporation of Delaware
No Drawing. Filed June 10, 1968, Ser. No. 735,542
Int. Cl. C08f 45/58
U.S. Cl. 260—45.85         9 Claims

ABSTRACT OF THE DISCLOSURE

This invention relates to heat stabilized olefin polymer compositions stabilized by a low molecular weight polyalkylated polymer such as poly-o-xylene. In synergistic combination with the polyalkylated polymer may be a dialkylthiodipropionate.

---

This invention relates to new improved olefin polymer compositions. More particularly, it relates to the use of low molecular weight polyalkylated aromatic polymers to improve the heat stability of olefin polymers.

Polymers of aliphatic olefins, such as for example polypropylene, have numerous valuable properties which permit them to be used in the manufacture of pipe, film, wire coating or various molded objects such as bottles and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use.

It has been discovered that olefin polymers and especially polypropylene may be heat stabilized by the addition of a low molecular weight polyalkylated aromatic polymer polymerized from monomers having the formula

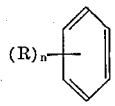

wherein R is an alkyl radical preferably having from 1–5 carbon atoms which may be primary, secondary, or tertiary and may be the same or different, and $n$ is at least 2 and preferably 2 to 4. Preferably, R is a methyl group. Preferred low molecular weight polymers are those which contain 3–15 monomer units and more preferably 3–5 monomer units.

The low molecular weight polyalkylated aromatic polymers are produced with the Kovacic catalyst, $AlCl_3 + CuCl_2$. A full description of the reaction conditions is discussed in detail below. Additionally, see P. Kovacic et al., Tetrahedron Letters No. 11,467 (1962) and P. Kovacic et al. J. Polymer Sci. Part A, 4297 (1965).

It has also been discovered that combinations of dialkylthiodipropionate and/or 1,3,5-trialkyl-2,4,6-tri(3,5-di-tert-alkyl-4-hydroxy-benzyl)benzene with the low molecular weight polyalkylated aromatic polymers act as heat stabilizers in olefin polymers to a greater extent than would otherwise be expected from their combined individual effects. These synergistic effects will be discussed in more detail below. Both 1,3,5-trialkyl-2,4,6-tri(3,5-di-tert-alkyl-4-hydroxy-benzyl)benzene and dialkylthiodipropionate are well known (see, for example, U.S. Pat. No. 3,190,852 to Doyle and U.S. Pat. No. 3,026,264 to Rocklin et al.). The alkyl groups in the dialkylthiodipropionate are preferably normal alkyl groups of 10 to 20 carbon atoms and most preferably identical groups of 12–18 carbon atoms each. The preferred ester for this invention is dilaurylthiodipropionate (DLTP) which is available commercially. The alkyl groups in the 1,3,5-trialkyl-2,4,6-tri(3,5-di-tert-alkyl-4-hydroxy-benzyl)benzene may each have up to 8 carbon atoms. The preferred benzene for this invention is 1,3,5-trimethyl-2,4,6-tri(3,5-ditertiarybutyl-4-hydroxy-benzyl)benzene (IONOX 330).

The polymers to which this invention applies are the normally solid polymers of aliphatic olefins having from 2–8 carbon atoms per molecule, such as homopolymers of ethylene, propylene, 1-butene, isobutylene, 2-butene, 1-pentene, 1-hexene and copolymers and terpolymers thereof, having molecular weights in the range from about 10,000 to about 1,000,000. Polymers made from olefins having more than two carbon atoms, for example, polypropylene or butene-ethylene copolymers, are especially unstable as compared to polyethylene because of their greater number of tertiary carbon atoms. The present invent is particularly suited to the heat stabilization of these polymers. These polymers are produced by polymerization of the corresponding olefins employing the Ziegler-type polymerization catalyst which is obtained by at least partially reducing in solution in a diluent a halide of an amphoteric metal selected from Groups IV–B, V–B, VI–B, and VIII of the Periodic System of Elements (see, for example, the Henry D. Hubbard Periodic Chart of the Elements, 1947 Ed., revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, an amphoteric metal halide is reduced in solution in a nonreactive, nonpolar organic diluent in any suitable manner such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and at least partially reduced amphoteric metal halide, is employed as the medium in which olefin polymerization is effected. The diluent to be employed should be nonreactive, nonpolar organic medium in which the amphoteric metal halide starting material is soluble to an extent at least sufficient to provide a 0.1 weight percent solution of amphoteric metal halide starting material. Thus, for example, in preparing the polymerization medium, a 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.), gas-oil distillate fractions obtained from the catalytic cracking of virgin gas-oil feedstocks, diesel oil, etc. It will be understood that, if desired, mixtures of two or more compatibile, miscible diluents may be employed. The diluent should be substantially completely free from oxygen, water, and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about $-60°$ to about $400°$ F., preferably at about room temperature. Higher temperatures may be employed but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are usually required, although reaction time may vary within the range of about 10 minutes to about 24 hours.

The olefin polymers of the type described and illustrated herein are produced by a catalyst of the nature described and having molecular weights as recited which are essentially insoluble in the nonpolar organic liquid and form a slurry of polymerized olefins therein.

These polymers are suitably quenched by adding alcohol, such as methyl alcohol, thereto to deactivate any catalyst, and additional amounts of methyl alcohol are added to precipitate the insoluble polymers from the resultant slurry. The polymer particles are separated and recovered from the slurry. Additional detail may be found in U.S. Pat. No. 2,692,259 to Edwin F. Peters, U.S. Pat. No. 2,791,576 to Edmunt Field, and U.S. Pat. No. 3,297,631 to Delos E. Brown.

The low molecular weight polyalkylated aromatic polymers and mixtures of these polymers with, for example, DLTP and/or IONOX 330 may be incorporated into the olefin polymers to be stabilized in various known ways; for example, the stabilizers may be milled into the polymers by the use of heated roll mills or deposited by the solvent evaporation method. The stabilizers may also be added to the final washed polymer slurry prior to drying or they may be added to the powder (fluff) prior to extrusion or molding.

It has been determined that the final heat stabilized composition should contain a major amount of olefin polymer and a minor amount of heat stabilizer. When the low molecular weight polyalkylated aromatic polymer is used alone as the heat stabilizer, it should be used in amounts of from about 0.25 to 5 percent and preferably about 0.25 to 3 percent. When it is used in a heat stabilizing mixture of dialkylthiodipropionate and/or 1,3,5-trialkyl - 2,4,6-tri(3,5-di-tert-4-hydroxy-benzyl)benzene, it should be used in amounts of from about 0.001 percent to 5 percent and prefarably about 0.05 percent to 3 percent. The dialkylthiodipropionate and 1,3,5-trialkyl-2,4,6-tri (3,5 - di-tert-alkyl-4-hydroxy-benzyl)benzene should be used in amounts of from about 0.001 to 5 percent and preferably about 0.05 percent to 3 percent.

The stabilizer combinations of the present invention lead to polyolefin compositions of improved stability against heat degration. Thus, polyolefins stabilized in accordance with this invention have an extended life expectancy and can be used more effectively than unstabilized polyolefins for a great number of uses. These polyolefins may be cast, extruded, rolled or molded into sheets, rods, tubes, piping filaments and other shaped articles. The present composition may be used for coating paper, cloth, wire, metal foil, glass fiber fabrics, synthetic or natural textiles and other such materials. Small amounts of other additives such as other polymers, resins, or plastics that are commonly added to polyolefins for specific uses and that are not deleterious to the effectiveness of the present synergistic combinations may be used in the polyolefin compositions of the invention.

The low molecular weight polyalkylated aromatic polymer additives are produced as shown in the following examples. It is to be understood, however, that the examples are for the purpose of illustration and the invention is not to be regarded as limited to any one of the specific materials or conditions recited therein. Unless otherwise indicated, parts are parts by weight.

(1) One mole of o-xylene was placed in a dry 500 ml., 3-neck, round-bottom flask which was equipped with a paddle stirrer. All operations were carried out under a nitrogen atmosphere. $AlCl_3$ (0.5 mole) and water (1 ml.) were next added, followed by $CuCl_2$ (0.25 mole) which was added slowly to avoid an initial fast reaction. The polymerization was carried out at 35° C. for 5 hours. The resulting brown powder had an ebullioscope molecular weight of 380, corresponding to about 4 monomer units.

(2) Same as example 1, except m-xylene was utilized in the place of o-xylene. The average molecular weight corresponded to 5 monomer units.

(3) Same as example 1, except p-xylene was utilized in the place of o-xylene. The average colcular weight corresponded to 5 monomer units.

(4) Same as example 1, except trimethylbenzene was utilized in the place of o-xylene. The average molecular weight corresponded to 3 monomer units.

The effectiveness of these additives was measured by two tests. In both, a polyolefin film (1 x 2 x .006 inch) containing the additive was heated in an air oven at 150° C. The first test is labeled the "tensile" test. The specimen was considered to have failed the tensile test if it tore upon being manually stretched. More specifically, a portion of the film was grasped between the thumbs and the index fingers of both hands, and using the ends of the fingers as a fulcrum while at the same time moving both hands away from each other, the film was stretched until it whitened at the part being stretched. The second test was labeled the "break on bending" test. The specimen was considered to have failed the break on bending test when the sample broke on bending.

The additive may be combined with the polyolefin by any conventional method. In the following comparisons the additive was deposited on unsatibilized polyolefin fluff by the solvent evaporation method—mixing the polyolefin and an acetone solution of the additive and then removing the acetone solvent by evaporation. The test samples were then compression molded into 1 x 2 x .006 inch strips and maintained in a 150° C. oven with a constant circulation of air.

The following table shows a comparison of the effectiveness as heat stabilizers in polypropylene of a number of the low molecular weight polyalkylated aromatic polymers.

TABLE 1

| 0.5% w. additive to polyproplyene: | Hours to failure at 150° C. tensile test |
|---|---|
| None | 5 |
| Poly-m-xylene | 8 |
| Poly-p-xylene | 24 |
| Poly-1,2,4-trimethylbenzene | 48 |
| Poly-o-xylene | 100 |

From the above table it can easily be seen that while all of the polyalkylated aromatic polymers increase the heat stability of polypropylene, poly-o-xylene is superior.

The following table shows further comparisons of various percent amounts of poly-o-xylene added to polypropylene to further disclose optimum characteristics.

TABLE 2

| Percent poly-o-xylene: | Hours to failure | |
|---|---|---|
| | Tensile | Break on Bending |
| 0 | 5 | 5 |
| 0.10 | 5 | 5 |
| 0.25 | 5 | 24 |
| 0.50 | 100 | 336 |
| 1.0 | 226 | >575 |
| 2.0 | 234 | >575 |

As can be seen from the above table, the unstabilized polypropylene film had oven lifetimes of about 5 hours at 150° C. Usually, the test sample deteriorated completely in less than 12 hours. The threshold concentration appears to be within the 0.25 to 0.50% w. range as that amount was needed to affect the tensile test.

As indicated earlier, it has also been discovered that a synergistic effect in the heat stabilization of polyolefins is realized when given amounts of dialkylthiodipropionate are combined with the low molecular weight polyalkylated aromatic polymer and the mixture is incorporated into the polyolefin in the manner earlier discussed. The following table discloses the results of testing various combinations of these additives.

TABLE 3

| Exp. No.: | Percent additive | | Hours to failure | |
|---|---|---|---|---|
| | Polyo-xylene | DLTP | Tensile | Break on bending |
| 1 | 0 | 0.20 | 20 | |
| 2 | 0.1 | 0.25 | 124 | |
| 3 | 0.5 | 0.20 | 194 | 336 |
| 4 | 2.0 | 0.20 | 220 | 575 |

As can readily be seen from the above table, DLTP, when used alone (see Experiment 1), produces a relatively poor heat stability. On the other hand, the heat stabilizing effect of a combination of DLTP and poly-o-xylene is far greater than would be expected from their combined individual effects (see Experiment 2). Note also that the amount of poly-o-xylene used as an additive in Experiment 2 is below the threshold amount necessary for producing heat stabilizing effects in polyolefins (see Table 2).

What is claimed is:

1. A heat stabilized polymer composition comprising polymer of aliphatic olefin having from 2-8 carbon atoms and from about 0.25 to 5 percent weight of a polyalkylated aromatic polymer containing 3-15 monomer units from monomers having the formula

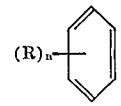

wherein R is an alkyl radical having 1-5 carbon atoms, and $n$ is 2 to 4.

2. A composition as in claim 1 wherein the olefin polymer is polypropylene.

3. A composition as in claim 1 wherein the polyalkylated aromatic polymer is taken from the group consisting of poly-o-xylene, poly-p-xylene and poly-trimethylbenzene.

4. A composition as in claim 2 wherein the polyalkylated aromatic polymer is poly-o-xylene.

5. A heat stabilized polymer composition comprising a polymer of aliphatic olefin having from 2-8 carbon atoms and a mixture of from 0.001 to 5 percent weight of a polyalkylated aromatic polymer containing from 3-15 monomer units from monomers having the formula

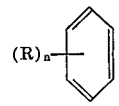

wherein R is an alkyl radical having 1-5 carbon atoms and $n$ is 2 to 4; and from 0.001 to 5 percent weight of a dialkyl thiodipropionate wherein the alkyl groups are normal alkyl of 10 to 20 carbon atoms.

6. A composition as in claim 5 wherein the olefin polymer is polypropylene.

7. A composition as in claim 6 wherein the polyalkylated aromatic polymer is poly-o-xylene.

8. A composition as in claim 7 wherein the dialkylthiodipropionate is dilaurylthiodipropionate.

9. A composition as in claim 5 wherein the amount of polyalkylated aromatic polymer is between about 0.05 and 3 percent by weight.

References Cited

UNITED STATES PATENTS

| 2,656,340 | 10/1953 | Sparks et al. | 260—897 |
| 2,968,641 | 1/1961 | Roberts et al. | 260—897 |
| 3,173,163 | 3/1965 | Cramton | 260—897 |
| 3,230,029 | 1/1966 | Cappuccio | 260—897 |
| 3,252,934 | 5/1966 | Jankens | 260—897 |
| 3,328,489 | 6/1967 | Murdock | 260—897 |

OTHER REFERENCES

Stille: "Introduction to Polymer Chemistry," J. Wiley & Son, 1962, p. 6.

HOSEA E. TAYLOR, Primary Examiner

U.S. Cl. X.R.

260—45.7, 45.95, 897